United States Patent
Meschik et al.

(10) Patent No.: US 6,333,610 B1
(45) Date of Patent: Dec. 25, 2001

(54) SPEED CONTROL DEVICE FOR AN ELECTRONICALLY COMMUTATED MULTIPHASE ELECTRIC MOTOR

(75) Inventors: Martin Meschik, Vienna; Markus Schermann, Wiener Neustadt, both of (AT)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/679,528

(22) Filed: Oct. 6, 2000

Related U.S. Application Data

(63) Continuation of application No. PCT/DE99/01044, filed on Apr. 6, 1999.

(30) Foreign Application Priority Data

Apr. 8, 1998 (DE) ............................................. 198 15 896

(51) Int. Cl.[7] .............................. H02K 37/00; H02P 7/00
(52) U.S. Cl. ........................ 318/254; 318/138; 318/439; 318/696; 318/685
(58) Field of Search ..................................... 318/138, 245, 318/254, 696, 685, 603, 600, 439, 524; 310/51, 179, 180

(56) References Cited

U.S. PATENT DOCUMENTS

| | | | |
|---|---|---|---|
| 3,769,555 | 10/1973 | Dolbachian et al. | |
| 4,093,905 | * 6/1978 | von Braun | 318/696 |
| 4,283,664 | 8/1981 | Ebert | |
| 4,888,533 | * 12/1989 | Gotoh et al. | 318/524 |
| 5,783,891 | * 7/1998 | Auinger et al. | 310/180 |
| 5,886,486 | * 3/1999 | Jeong et al. | 318/254 |
| 6,201,322 | * 3/2001 | Heine et al. | 310/51 |

FOREIGN PATENT DOCUMENTS

| | | |
|---|---|---|
| 24 03 432 A | 7/1975 | (DE) . |
| 26 39 055 B2 | 3/1977 | (DE) . |
| 196 30 036 A | 1/1998 | (DE) . |
| 1 563 015 | 3/1980 | (GB) . |

* cited by examiner

*Primary Examiner*—Paul Ip
(74) *Attorney, Agent, or Firm*—Sughrue Mion, PLLC

(57) ABSTRACT

A speed control device, whereby individual motor phases of an electronically commutated multiphase electric motor are supplied via corresponding individual phase shifters from a constant voltage supply unidirectionally and unpulsed during time blocks which are derived from stored time block pulse patterns specific to certain speeds. The speed control device permits setting a variety of speeds with relatively little expense and with low operating losses. The speed control device further provides a simple device for setting intermediate speeds by means of low-frequency switching between at least two time block pulse patterns.

18 Claims, 3 Drawing Sheets

SPEED CONTROL DEVICE FOR AN ELECTRONICALLY COMMUTATED MULTIPHASE ELECTRIC MOTOR

This is a Continuation of International Application PCT/DE99/01044, with an international filing date of Apr. 6, 1999, the disclosure of which is incorporated into this application by reference.

FIELD OF AND BACKGROUND OF THE INVENTION

The invention concerns a speed control device for an electronically commutated multiphase electric motor. These types of speed control devices are used in combination with permanently excited electronically commutated multiphase electric motors in motor vehicles, particularly for fan drives or pump drives with a relatively small starting load moment.

U.S. Pat. No. 5,563,481 discloses a speed control device for electronically commutated multiphase electric motors with adjustable speeds, in which the pulse width of the supply voltage is modulated by means of a high frequency, inaudible 20 kHz pulse. U.S. Pat. No. 5,589,745 discloses a second speed control device which provides pulse width modulation of the supply voltage by means of a drive circuit with pulse groups that can be adjusted with respect to amplitude and/or duration. However, these known speed control devices require complex hardware and/or expensive software.

British Laid-Open Publication GB-OS 1 563 015 (which corresponds to German Laid Open Publication 26 39 055 B2), U.S. Pat. Nos. 4,283,664, and 3,769,555 disclose speed control devices for electronically commutated electric motors having motor phases that can be powered unidirectionally and unpulsed during definable time blocks by phase shifters from a constant voltage supply, depending on rotor position sensor signals, thereby creating torque.

For the device of GB-OS 1 563 015, various speeds can be achieved by the assignment of definite pulse patterns to defined speeds. U.S. Pat. No. 4,283,664 provides for setting various speeds by adjustment of the constant voltage supply source. U.S. Pat. No. 3,769,555 permits the setting of various speeds by means of a pulse generator that adjusts pulse width and pulse frequency.

OBJECTS OF THE INVENTION

According to one object of the present invention, it is sought to provide a variable-speed drive with speeds that can be set as desired, which device can be made at a significantly lower hardware and software expense, while still completely satisfying the required operating conditions.

SUMMARY OF THE INVENTION

According to one formulation, the present invention is directed to a speed control device that requires less expensive components by applying a unidirectional, unpulsed supply to each of the motor phases, via only one simple, in particular transistorized, phase shifter. Preferably, the phase shifter is connected directly with its neutral side to one terminal of the constant voltage supply. By alternating switching between two (or more) time block pulse patterns, which are assigned respectively to different motor speeds, intermediate speeds can easily be achieved by switching between different time blocks at a switching frequency, that is below audible frequencies. This switching frequency is determined according to the length of the time block and/or the moment of switching. Moreover, this switching frequency is dependent only on the mechanical time constants of the drive system, with a view to ensuring a non-jerking rotational speed setting. The switching losses can thereby be significantly reduced relative to prior art speed control devices employing high frequency pulse width modulation.

BRIEF DESCRIPTION OF THE DRAWINGS

The invention and advantageous refinements thereof are described in more detail below with reference to a schematic exemplary embodiment in the drawings, in which.

DETAILED DESCRIPTION OF THE PREFERRED EMBODIMENTS

Figure 1:
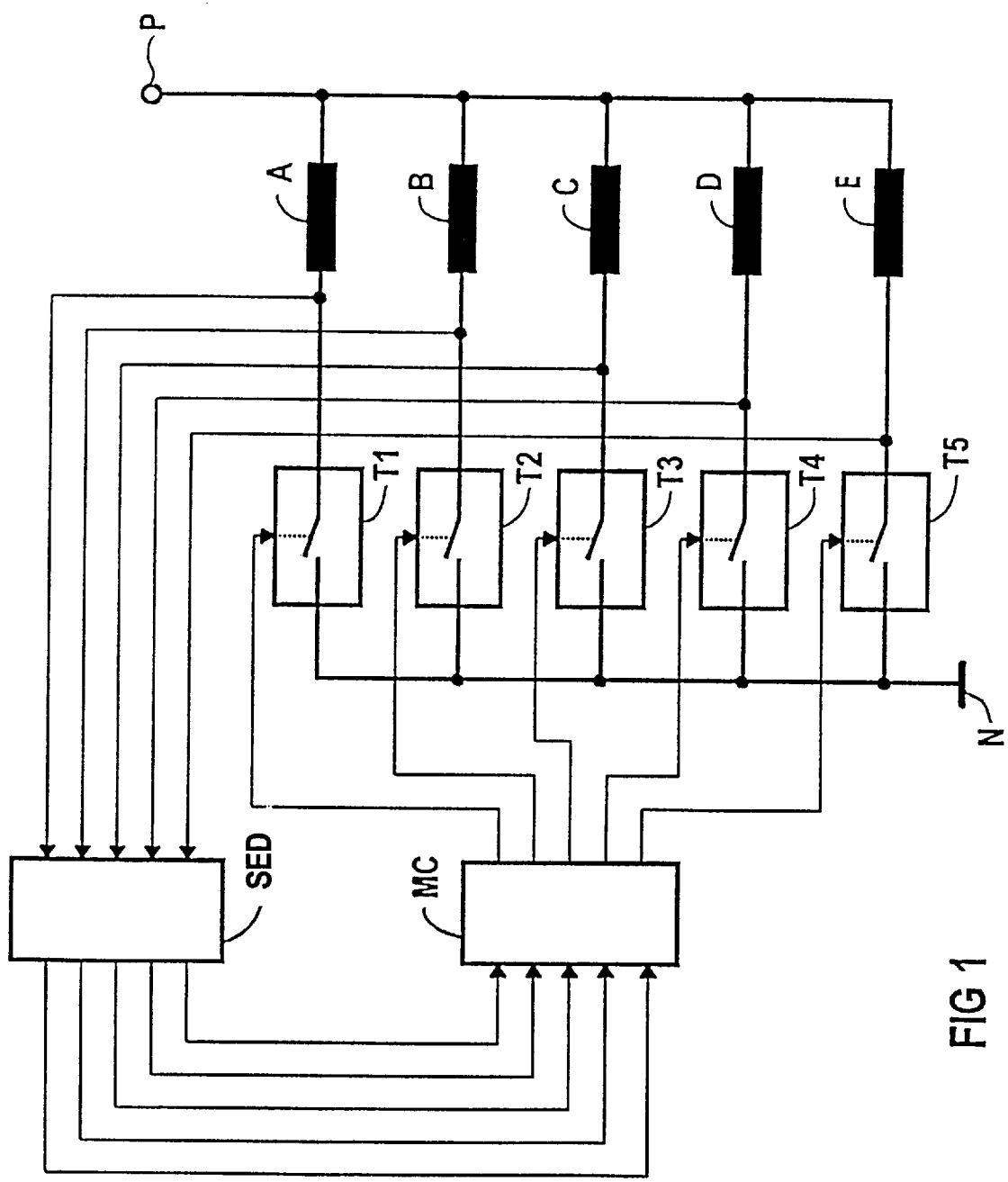
FIG. 1 shows a block diagram of an electronically commutated electric motor with five motor phases each connected to a constant voltage supply via a phase shifter, in accordance with rotor position sensor signals.
Figure 2:
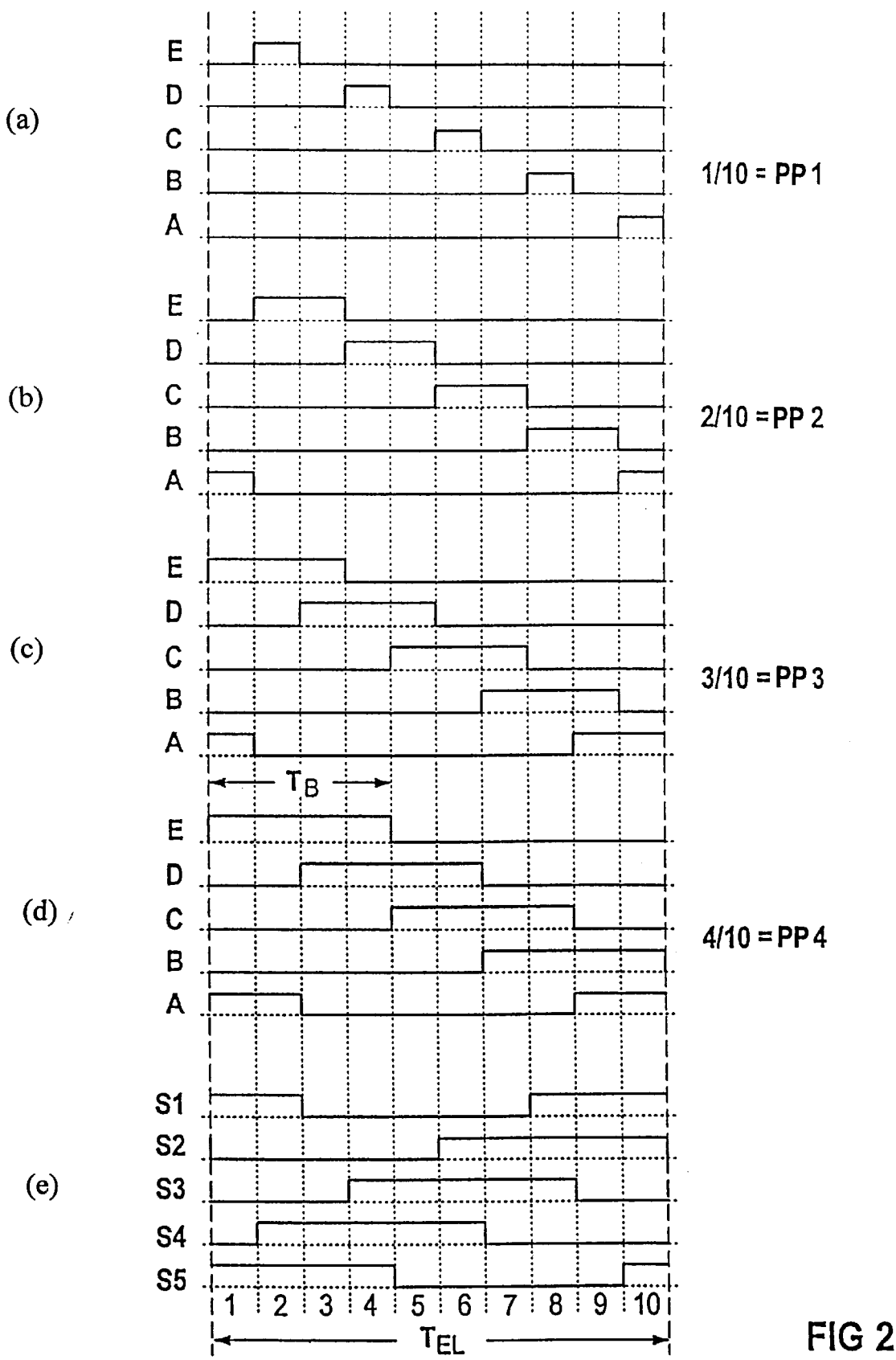
FIGS. 2(a)–(d) show an assignment of five rotor position sensor signals, shown in FIG. 2(e), to four different time block pulse patterns in an electric motor with a permanent magnet excited rotor having three pairs of poles.

FIG. 1 shows a block diagram of an electronically commutated electric motor with five motor phases, A, B, C, D, and E, which are distributed over the circumference of the stator. Each of the motor phases A–E is powered via a transistorized phase shifter, T1, T2, T3, T4, or T5, from a constant voltage supply P; N, for example a vehicle electrical system, which provides an unpulsed, unidirectional supply during a time block $T_B$ of the respective phase shifter. A permanently excited rotor (not shown here), which has six permanent magnet poles, and therefore three pairs of poles, induces voltages in the motor phases A–E. These induced voltages are transmitted as rotor position sensor signals S1, S2, S3, S4 and S5 to a sensor signal evaluation device SED. Drive commands for the time blocks $T_B$ of the phase shifters T1–T5 are transmitted from the sensor signal evaluation device SED to a microcontroller MC, which is already present as a component of the speed control device. The microcontroller MC then drives the phase shifters T1–T5, according to the time block pulse patterns PP1, PP2, PP3, and PP4 that are stored in it. These time block pulse patterns PP1–PP4 are assigned to definite, respective motor speeds.

FIGS. 2(a)–(d) show examples of four of these types of time block pulse patterns PP1–PP4, each with different time blocks $T_B$ for connecting and disconnecting the individual motor phases A–E to the constant voltage supply P; N, in accordance with the rotor position sensor signals S1–S5. The time block pulse patterns PP1–PP4 depicted in FIG. 2 correspond to a rotor which is equipped with six permanent magnet poles, such that the north and south poles alternate every 60° around the circumference of the rotor. Accordingly, an electrical period $T_{EL}$ of the induced rotor position signal voltage corresponds mechanically to 120°. FIG. 2(e) shows the induced rotor position sensor signals S1–S5 over the electrical period $T_{EL}$. From FIG. 2(e), it can be seen that there are ten time segments, in which different rotor positions are detectable. FIGS. 2(a)–(d) show, as a function of the rotor position sensor signals S1–S5, the respective time blocks $T_B$ during which the individual motor phases A–E are supplied with current, which is unidirectional and unpulsed. The current is supplied in accordance with the rotor position sensor signals S1–S5 and in correspondence to the various time block pulse patterns PP1–PP4.

During a time block $T_B$, that corresponds to 4/10 of the maximum possible current supply of a motor phase during an electrical period $T_{EL}$, in this particular example, the maximum speed of the electric motor will be attained. In this so-called 100% block operation, each of the motor phases is supplied with current for 2/3 $T_{EL}$ in one current direction, such that two motor phases are supplied at once at any given time.

Proceeding from an assignment of the nominal speed of the electric motor to the time block pulse pattern PP4=4/10, correspondingly lower speeds result for the other time block pulse patterns PP3=3/10, PP2=2/10, and PP1=1/10 depicted.

Preferably, the rotor position sensor signals S1–S5 and the associated time block pulse patterns PP1–PP4 are digitally processed, stored, and further processed into signals for driving the phase shifters T1–T5. The following table shows the digital assignment of the rotor position sensor signals S1–S5 to the associated time block pulse patterns PP1–PP4, for the motor phases A–E, in each of the ten time segments. The rotor position sensor signals S1–S5 are induced in the five motor phases A–E during rotation of the permanently excited rotor having three pairs of poles. Each of the associated time block pulse patterns PP1–PP4 corresponds to its respective connection and disconnection time blocks $T_B$. The ten time segments correspond to the maximum possible subdivision of $T_{EL}$ in the example described above and depicted in FIG. 2.

| Time Slot | S1–S5 54321 | PP1 1/10 EDCBA | PP2 2/10 EDCBA | PP3 3/10 EDBCA | PP4 4/10 EDBCA |
|---|---|---|---|---|---|
| 1. | 10001 | 00000 | 00001 | 10001 | 10001 |
| 2. | 11001 | 10000 | 10000 | 10000 | 10001 |
| 3. | 11000 | 00000 | 10000 | 11000 | 11000 |
| 4. | 11100 | 01000 | 01000 | 01000 | 11000 |
| 5. | 01100 | 00000 | 01000 | 01100 | 01100 |
| 6. | 01110 | 00100 | 00100 | 00100 | 01100 |
| 7. | 00110 | 00000 | 00100 | 00110 | 00110 |
| 8. | 00111 | 00010 | 00010 | 00010 | 00110 |
| 9. | 00011 | 00000 | 00010 | 00011 | 00011 |
| 10. | 10011 | 00001 | 00001 | 00001 | 00011 |

According to the present invention, intermediate speeds can be produced by switching between the individual table entries of the time block pulse patterns by proceeding from the defined assignment of the rotor position sensor signals S1–S5 to the driving signals of the phase shifters T1–T5 of the individual motor phases A–E in the form of time block pulse patterns PP1–PP4. Preferably, this assignment is stored in the previously mentioned tabular form, in a ROM within the microcontroller MC. In addition to changing the durations of the time blocks $T_B$, speed can also be changed by switching on the time blocks $T_B$ at different moments corresponding to a division of the time segments. Setting the speed by alternating or time-oriented switching of the stored time block pulse patterns is, preferably, also predefined and stored.

The switching frequency $f_S$ forms the basis for switching between different time block pulse patterns and is dependent on the mechanical time constants of the motor system. Based upon the situation given, the switching frequency $f_S$ can be advantageously provided within a range of a few Hertz, in particular below the threshold of audibility.

Figure 3:
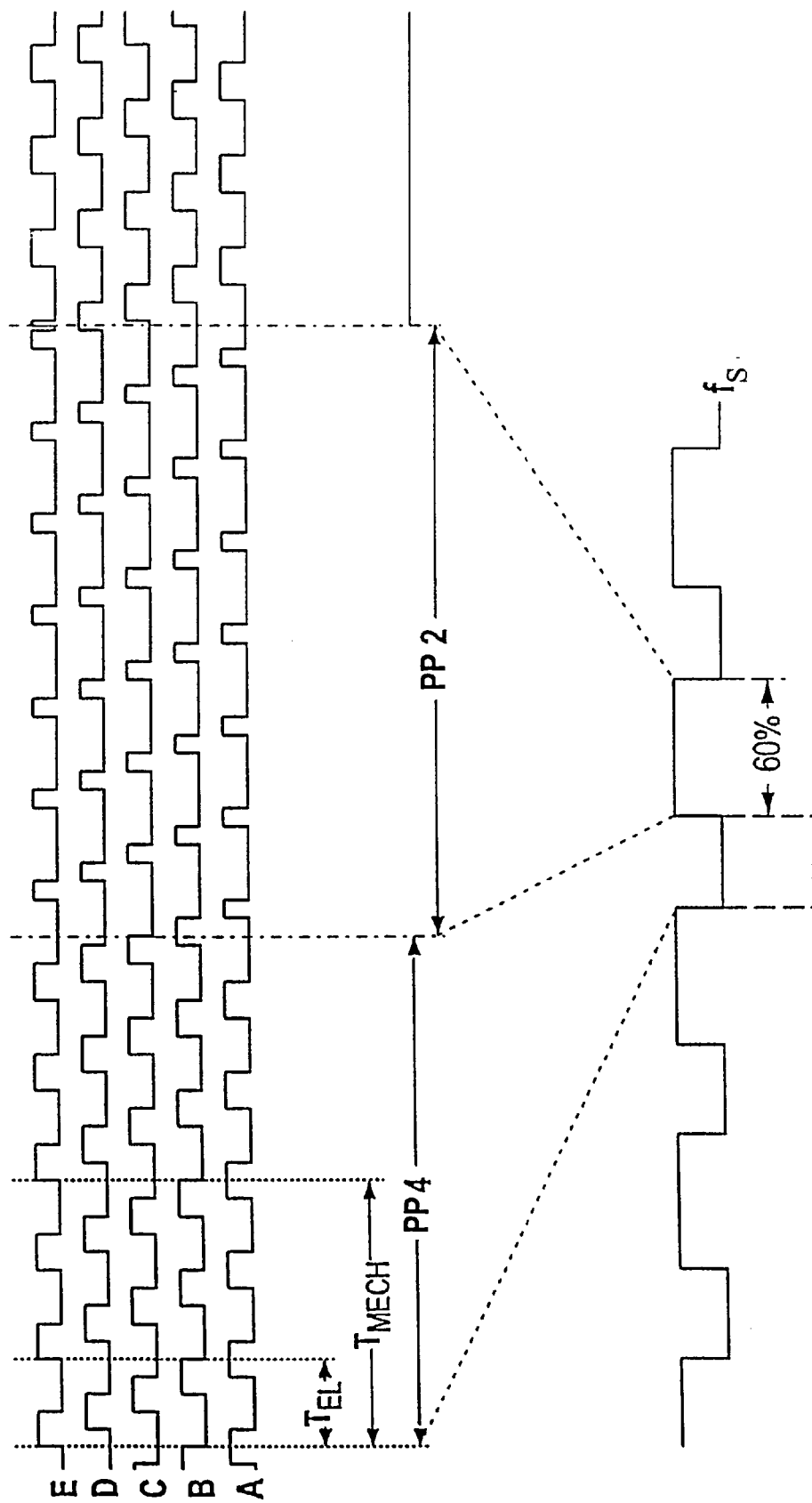
FIG. 3 shows alternating switching between two different time block pulse patterns to attain a speed corresponding to approximately 70% of the nominal speed of the electric motor.

FIG. 3 depicts driving of the motor phases A–E for a speed corresponding to approximately 70% of the nominal motor speed. To attain this exemplary speed, a switching frequency $f_S$ is provided for switching in appropriate proportion between a time block pulse pattern that corresponds to a motor speed higher than the desired speed (e.g., PP4), and a time block pulse pattern that corresponds to a motor speed lower than the desired speed (e.g., PP2). The switching frequency $f_S$ is set, e.g., in such a way that for 40% of its period a time block pulse pattern PP4=4/10 is used, while, for the remaining 60% of the period of the switching frequency $f_S$, a time block pulse pattern PP2=2/10 is used. For the assumed pole pair number p=3, the duration of the electrical period $T_{EL}$ is one-third of the duration of the mechanical period $T_{MECH}$.

The dwelling time in a specific operating condition of a time block pulse pattern determines the mean speed which the electric motor assumes. In any operating condition, the electric motor develops a specific driving torque, which leads to a specific operating speed corresponding to the effective known load. Therefore, for a defined load moment of any operating condition, a specific speed can be assigned and stored in the microcontroller for a specific request.

When the motor is started, an excessive current load can be easily avoided by selecting an appropriate start mode with a corresponding time block pulse pattern by the microcontroller.

The above description of the preferred embodiments has been given by way of example. From the disclosure given, those skilled in the art will not only understand the present invention and its attendant advantages, but will also find apparent various changes and modifications to the structures and methods disclosed. It is sought, therefore, to cover all such changes and modifications as fall within the spirit and scope of the invention, as defined by the appended claims, and equivalents thereof.

What is claimed is:

1. A speed control device for use with an electronically commutated multiphase electric motor, comprising:

a plurality of phase shifters;

a sensor signal evaluation device, evaluating rotor position sensor signals;

a time block pulse pattern source, providing at least two distinct time block pulse patterns, each assigned to a specific motor speed;

a switching frequency source, providing at least one switching frequency that is below the audible frequency range; and a controller, wherein the phase shifters control delivery of unidirectional and unpulsed power during definable time blocks to motor phases of the electric motor from a constant voltage supply, thereby creating torque, and wherein the controller controls the phase shifters in accordance with the evaluated rotor position sensor signals and the time block pulse patterns and alternately switches between the time block pulse patterns at the switching frequency.

2. A speed control device according to claim 1, wherein the switching frequency is within a range of 5 Hz to 20 Hz.

3. A speed control device according to claim 1, wherein the time block pulse pattern source comprises a time block memory element storing the time block pulse patterns.

4. A speed control device according to claim 3, wherein the controller comprises a microcontroller containing the time block memory element.

5. A speed control device according to claim 1, wherein the switching frequency source comprises a frequency memory element storing the at least one switching frequency, for alternately switching between the time block pulse patterns.

6. A speed control device according to claim 1, wherein the sensor signal evaluation device performs digital detection of the rotor position sensor signals.

7. A speed control device according to claim 1, wherein the controller comprises a microcontroller that digitally processes the evaluated rotor position sensor signals.

8. A speed control device according to claim 1, further comprising:
a digital data source providing a digital assignment of the rotor position sensor signals to the time block pulse patterns for all possible value combinations of the rotor position sensor signals,
wherein the controller references the digital assignment and the evaluated rotor phase sensor signals in controlling the phase shifters.

9. A speed control device according to claim 8, wherein the controller comprises a microcontroller containing the digital data source.

10. A speed control device, for use with an electronically commutated electric motor having five motor phases on a stator side and three pairs of poles on a rotor side, the speed control device comprising:
five phase shifters, each corresponding to one of the motor phases;
a sensor signal evaluation device, evaluating five rotor position sensor signals;
a time block pulse pattern source, providing at least two distinct time block pulse patterns, each assigned to a specific motor speed;
a switching frequency source, providing at least one switching frequency that is below the audible frequency range; and
a controller,
wherein the phase shifters control delivery of unidirectional and unpulsed power during definable time blocks to the motor phases from a constant voltage supply, thereby creating torque, and
wherein the controller controls the five phase shifters in accordance with the evaluated five rotor position sensor signals and the time block pulse patterns and alternately switches between the time block pulse patterns at the switching frequency.

11. A speed control device according to claim 10, wherein:
the time block pulse pattern source comprises a time block memory element storing the time block pulse patterns, each being assigned to a specific motor speed; and
the switching frequency source comprises a frequency memory element storing the at least one switching frequency, for alternately switching between the time block pulse patterns.

12. A speed control device according to claim 10, wherein:
the sensor signal evaluation device performs digital detection of the rotor position sensor signals, and
the controller comprises a microcontroller that digitally processes the evaluated rotor position sensor signals.

13. A speed control device according to claim 12, wherein the microcontroller:
contains a digital assignment of the rotor position sensor signals to the time block pulse patterns for all possible value combinations of the rotor position sensor signals, and references the digital assignment in controlling the phase shifters.

14. An electronically commutated electric motor comprising:
a permanent magnet excited rotor;
a stator having a plurality of motor phases;
a power source; and
a speed control device comprising:
a plurality of phase shifters;
a sensor signal evaluation device, evaluating rotor position sensor signals;
a time block pulse pattern source, providing at least two distinct time block pulse patterns, each assigned to a specific motor speed;
a switching frequency source, providing at least one switching frequency that is below the audible frequency range; and
a controller,
wherein the phase shifters control delivery of unidirectional and unpulsed power during definable time blocks to the motor phases from the power source, thereby creating torque, and
wherein the controller controls the phase shifters in accordance with the evaluated rotor position sensor signals and the time block pulse patterns and alternately switches between the time block pulse patterns at the switching frequency.

15. A method of achieving an intermediate speed, for an electronically commutated electric motor, comprising the steps of:
evaluating rotor position sensor signals;
delivering unidirectional and unpulsed power during definable time blocks to motor phases of the electric motor via phase shifters, thereby creating torque;
controlling the phase shifters in response to the evaluated rotor position sensor signals and in accordance with distinct time block pulse patterns, each assigned to a specific motor speed; and
further controlling the phase shifters by alternately switching between the time block pulse patterns at a switching frequency, that is below the audible frequency range, thereby providing the intermediate speed.

16. A method of achieving intermediate speeds according to claim 15, wherein the evaluation step further comprises:
digitally detecting the rotor position sensor signals;
processing the rotor position sensor signals; and
outputting evaluated rotor position sensor signals.

17. A method of achieving intermediate speeds according to claim 15 further comprising the step of:
storing a digital assignment of the rotor position sensor signals to the time block pulse patterns for all possible value combinations of rotor position sensor signals.

18. A method of achieving intermediate speeds according to claim 17, wherein the control steps further comprise:
digitally processing the evaluated rotor position sensor signals, in accordance with the distinct time block pulse patterns, using the digital assignment; and
outputting phase shifter control signals to the phase shifters to provide the intermediate speed.

* * * * *